United States Patent
Likhachev et al.

(10) Patent No.: US 10,766,487 B2
(45) Date of Patent: Sep. 8, 2020

(54) VEHICLE DRIVING SYSTEM

(71) Applicant: DENSO International America, Inc., Southfield, MI (US)

(72) Inventors: Maxim Likhachev, Pittsburgh, PA (US); Ellis Ratner, Pittsburgh, PA (US); Lu Lyu, Pittsburgh, PA (US); Takashi Bando, Mountain View, CA (US); Yunfei Xu, Milpitas, CA (US)

(73) Assignees: Denso International America, Inc., Southfield, MI (US); Robotwits LLC, Pittsburgh, PA (US)

( * ) Notice: Subject to any disclaimer, the term of this patent is extended or adjusted under 35 U.S.C. 154(b) by 79 days.

(21) Appl. No.: 16/102,678

(22) Filed: Aug. 13, 2018

(65) Prior Publication Data

US 2020/0047750 A1  Feb. 13, 2020

(51) Int. Cl.
| | |
|---|---|
| *B60W 30/095* | (2012.01) |
| *G05D 1/00* | (2006.01) |
| *B60W 30/09* | (2012.01) |
| *B60W 50/00* | (2006.01) |
| *G06K 9/00* | (2006.01) |
| *G05D 1/02* | (2020.01) |

(52) U.S. Cl.
CPC ........ *B60W 30/0956* (2013.01); *B60W 30/09* (2013.01); *B60W 50/0097* (2013.01); *G05D 1/0088* (2013.01); *G05D 1/0214* (2013.01); *G06K 9/00798* (2013.01); *G06K 9/00805* (2013.01); *B60W 2554/00* (2020.02); *B60W 2554/801* (2020.02); *G05D 2201/0213* (2013.01)

(58) Field of Classification Search
CPC ................................................ B60W 30/0956
See application file for complete search history.

(56) References Cited

U.S. PATENT DOCUMENTS

| | | |
|---|---|---|
| 6,470,271 B2 | 10/2002 | Matsunaga |
| 7,610,121 B2 | 10/2009 | Nishira et al. |
| 8,457,827 B1 | 6/2013 | Ferguson et al. |
| 8,538,902 B2 | 9/2013 | Taguchi |
| 8,755,997 B2 | 6/2014 | Au et al. |
| 9,104,965 B2 | 8/2015 | Fritsch et al. |
| 9,164,507 B2 | 10/2015 | Cheatham, III et al. |
| 9,187,099 B2 | 11/2015 | Powers et al. |

(Continued)

FOREIGN PATENT DOCUMENTS

WO    2012047977 A2    4/2012

OTHER PUBLICATIONS

Jae-Hyuck Park et al., "A simulation based method for vehicle motion prediction," (2015), Elsevier, Computer Vision and Image Understanding, pp. 79-91.

*Primary Examiner* — Anne Marie Antonucci
*Assistant Examiner* — Abdalla A Khaled
(74) *Attorney, Agent, or Firm* — Brooks Kushman P.C.

(57) ABSTRACT

Autonomous driving systems and methods include a controller of a first vehicle configured to detect an operating state of a second vehicle proximate the first vehicle, and to predict, based on the operating state of the second vehicle, a potential behavior for the second vehicle that optimizes a cost function from the perspective of the second vehicle. The controller then controls the first vehicle to avoid a collision with the second vehicle assuming the second vehicle operates according to the potential behavior.

20 Claims, 4 Drawing Sheets

(56) References Cited

U.S. PATENT DOCUMENTS

| | | | |
|---|---|---|---|
| 9,224,299 B2 | 12/2015 | Taguchi et al. | |
| 9,248,834 B1* | 2/2016 | Ferguson | B60W 30/09 |
| 9,290,186 B2 | 3/2016 | Attard et al. | |
| 9,381,916 B1 | 7/2016 | Zhu et al. | |
| 9,495,874 B1* | 11/2016 | Zhu | G06N 20/00 |
| 9,511,767 B1 | 12/2016 | Okumura et al. | |
| 2010/0036578 A1 | 2/2010 | Taguchi et al. | |
| 2013/0054106 A1 | 2/2013 | Schmudderich et al. | |
| 2013/0197736 A1 | 8/2013 | Zhu et al. | |
| 2014/0303883 A1* | 10/2014 | Aso | B60W 30/10 701/300 |
| 2015/0266477 A1 | 9/2015 | Schmudderich | |
| 2018/0341269 A1* | 11/2018 | Lv | G01C 21/3453 |

* cited by examiner

VEHICLE DRIVING SYSTEM

TECHNICAL FIELD

Aspects of this disclosure generally relate to vehicle driving systems.

BACKGROUND

Autonomous vehicle driving systems depend on the ability of the vehicle to accurately model its surrounding environment.

SUMMARY

In one exemplary embodiment, an autonomous driving system of a first vehicle includes a controller configured to detect an operating state of a second vehicle traveling proximate the first vehicle, and to predict, based on the operating state of the second vehicle, a potential behavior for the second vehicle that optimizes a cost function from the perspective of the second vehicle. The controller is further configured to control the first vehicle to avoid a collision with the second vehicle assuming the second vehicle operates according to the potential behavior.

In another embodiment, a controller for an autonomous driving system of a first vehicle includes at least one processor and a memory storing instructions that, upon execution by the at least one processor, causes the at least one processor to detect an operating state of a second vehicle traveling proximate the first vehicle, and to predict, based on the operating state of the second vehicle, a potential behavior for the second vehicle that optimizes a cost function from the perspective of the second vehicle. The instructions upon execution further cause the at least one processor to control the first vehicle to avoid a collision with the second vehicle assuming the second vehicle operates according to the potential behavior.

In a further embodiment, a method includes, by one or more processors of a first vehicle, detecting an operating state of a second vehicle traveling proximate the first vehicle, and predicting, based on the operating state of the second vehicle, a potential behavior for the second vehicle that optimizes a cost function from the perspective of the second vehicle. The method further includes controlling the first vehicle to avoid a collision with the second vehicle assuming the second vehicle operates according to the potential behavior.

DETAILED DESCRIPTION

Figure 1:
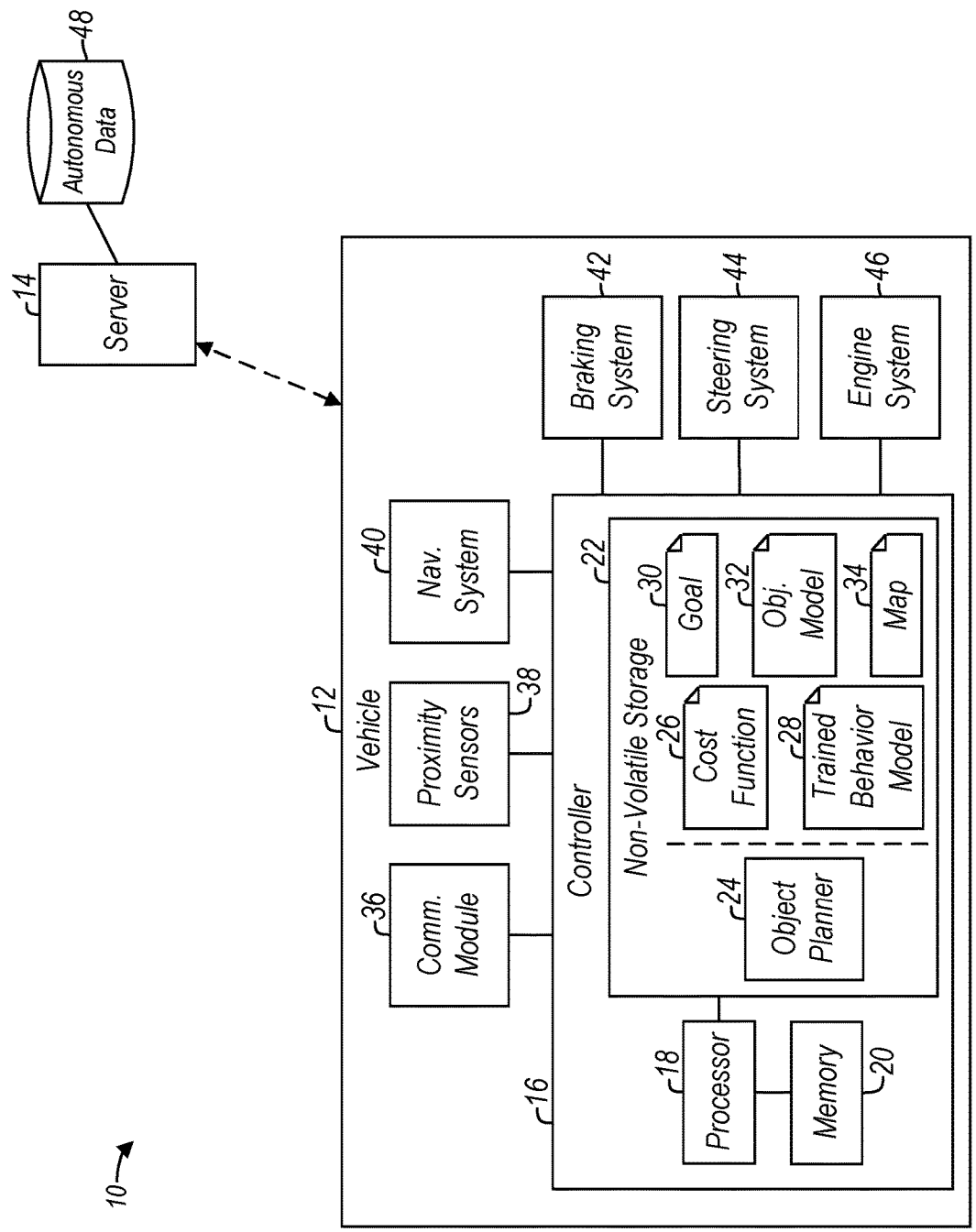
FIG. 1 is a schematic diagram of an exemplary autonomous vehicle driving system for controlling a vehicle by planning operation on behalf of objects proximate the vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An autonomous driving system of a vehicle may be configured to control the vehicle by predicting the future behaviors of objects, such as other vehicles, proximate to the vehicle being controlled. For such a system to perform well, these predictions need to be accurate. In some cases, the autonomous vehicle driving system may be configured to predict the future behavior of a proximate object by applying current observations of the proximate object to a trained behavior model built from a large data set of previous object behavior. This approach may be referred to herein as a learning-based approach. While the learning-based approach may perform well under normal driving conditions, this approach can fail when the autonomous vehicle driving system is confronted with a situation not well-represented by the trained behavior model. For example, if the autonomous vehicle driving system confronts an anomalous driving situation, such as an unexpected or rarely-observed driving situation, little or no previous object behavior may have been observed and collected for the situation, and correspondingly, the trained behavior model may not accurately reflect vehicle behavior for the situation. Consequently, the trained behavior model may cause the autonomous vehicle driving system to act in accordance with a poor or inaccurate prediction, which may result in dangerous on-road circumstances.

Thus, in addition or alternatively to implementing the learning-based approach, the autonomous vehicle driving system may also be configured to implement a planning-based approach for proximate objects. Specifically, rather than simply applying observations of a proximate object to a trained behavior model and receiving a prediction, the autonomous vehicle driving system may be configured to generate a driving plan for the proximate object, such as if the autonomous vehicle driving system was controlling operation of the proximate object. For example, the autonomous vehicle driving system may be configured to determine, based on an observed operating state of the proximate object, a predicted behavior for the proximate object that optimizes a cost function from the perspective of the proximate object, and to issue control commands to its vehicle based thereon. Because the predicted behavior may be more accurate than a prediction generated using a trained behavior model, such as in the case of anomalous driving situations, the planning-based approach may produce a better outcome (e.g., collision avoidance) than the learning-based approach, and do so without needing to rely on a trained behavior model based on previously observed object behaviors. In some embodiments, the autonomous vehicle driving system may be configured to utilize the planning-based approach in concert with the learning-based approach to take advantage of the benefits of each approach.

FIG. 1 illustrates a system 10 for implementing an autonomous driving system configured to generate a driving plan for an autonomous vehicle by planning the operation of other objects proximate to the vehicle. The system 10 may include an autonomous vehicle 12 and a remote server 14. The vehicle 12 may wirelessly communicate with the remote server 14 via one or more networks, such as one or more of the Internet, a local area network, a wide area network, and a cellular network.

The vehicle 12 may include a controller 16. The controller 16 may be a vehicle controller, such as an electronic control unit ("ECU"). The controller 16 may be configured to implement the planning-based approach and/or the learning-based approach described herein. In other words, the controller 16 may be configured to plan the operation of other vehicles traveling proximate the vehicle 12, and to control the vehicle 12 based thereon.

The controller 16 may include a processor 18, memory 20, and non-volatile storage 22. The processor 18 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 20. The memory 20 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage 22 may include one or more persistent data storage devices such as a hard drive, optical drive, tape drive, non-volatile solid-state device, or any other device capable of persistently storing information.

The processor 18 may be configured to read into memory 20 and execute computer-executable instructions embodying one or more software programs, such as an object planner 24, residing in the non-volatile storage 22. The object planner 24 may be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the object planner 24 may be configured, upon execution by the processor 18, to cause the controller 16 to implement the object planner 24, and correspondingly to implement functions, features, and processes of the object planner 24 described herein.

The non-volatile storage 22 may also include data utilized by the controller 16, or more particularly by the object planner 24, when implementing the functions, features, and processes of the controller 16 described herein. For example, the non-volatile storage 22 may include cost function data 26, trained behavior model data 28, goal data 30, object model data 32, and map data 34, each of which may enable the object planner 24 to predict behaviors of other objects proximate the vehicle 12. The cost function data 26 may define one or more cost functions, each which may map a candidate trajectory for a proximate object to a cost value to the object for taking the trajectory. The trained behavior model data 28 may define one or more trained behavior models, each which may be configured to predict the future behavior of a given proximate object based on a data set of previously observed object behaviors and current observations of the proximate object. The goal data 30 may define goals for various objects given a particular travel context (e.g., highway road, city road, object class such as passenger vehicle, motorcycle, semi-truck, bicycle, pedestrian, or non-moving object in the road). The object model data 32 may define one or more object models, which may set forth the dynamics for various object classes. The map data 34 may define travel infrastructure details by location.

The non-volatile storage 22 may also include one or more database structures for collecting, organizing, and enabling fast retrieval of the data stored therein. For example, the stored data may be arranged in one or more relational databases, one or more hierarchical databases, one or more network databases, or combinations thereof. A database management system in the form of computer software executing as instructions on the processor 18 may be used to access the information or data records of the databases in response to a query, which may be dynamically determined and executed by the object planner 24.

The controller 16 may communicate with other components of the vehicle 12, such as a communications module 36, various proximity sensors 38, a navigation system 40, a braking system 42, a steering system 44, and an engine system 46. The controller 16 may be directly connected to one or more of these other components, such as via various input/output (I/O) ports of the controller 16. Additionally, or alternatively, the controller 16 may communicate with one or more of these other components over one or more in-vehicle networks, such as a vehicle controller area network (CAN), an Ethernet network, a media oriented system transfer (MOST) network, and a wireless local area network (WLAN).

The communications module 36 may be configured to facilitate wireless communication between the vehicle 12 components and other devices and systems external to the vehicle 12, such as the remote server 14, using radio frequency (RF) transmissions. For example, the communications module 36 may include a cellular modem or other wireless network transceiver (e.g., Wi-Fi transceiver) configured to communicate with the remote server 14 over one or more networks, such as one or more of the Internet, a local area network, a wide area network, and a cellular network to which the cellular modem is subscribed. The controller 16 may communicate with the remote server 14 by accessing the communication capabilities of the communications module 36.

The communications module 36 may also include one or more wireless transceivers configured to facilitate direct wireless communication with other devices and systems, such as a personal computer device or key fob, when such other devices and systems are local to (e.g., within direct wireless communication range of) the vehicle 12. To facilitate such local wireless communications, the communications module 36 may include a Bluetooth transceiver, a ZigBee transceiver, a Wi-Fi transceiver, a radio-frequency identification ("RFID") transceiver, a near-field communication ("NFC") transceiver, a vehicle-to-vehicle (V2V) transceiver, a vehicle-to-infrastructure (V2I) transceiver, and/or transceivers designed for other RF protocols particular to remote services provided by the vehicle 12 (e.g., keyless entry, remote start, passive entry passive start).

The proximity sensors 38 may be configured to detect objects proximate to the vehicle 12, and to correspondingly generate proximity data indicative of the current operating state of such objects. For example, the proximity sensors 38 may be configured to detect the existence of other vehicles, lane lines, guard rails, objects in the roadway, buildings, and pedestrians within a particular distance of the vehicle 12. The proximity sensors 38 may be configured to communicate the generated proximity data to the to the controller 16, which may be configured to interpret the proximity data to derive the operating state of each detected proximate object.

For example, the controller 16 may be configured to identify a pose for each proximate object, which may indicate the position and orientation of each object relative to the vehicle 12 (e.g., angle and distance). The controller 16 may also be configured to identify movement information for each proximate object (e.g., speed, velocity, acceleration), and a class for each proximate object (e.g., passenger vehicle, truck, motorcycle, pedestrian, bicycle). The controller 16 may then be configured to utilize the operating state of each proximate object to plan an operation for the object, such as slowing down or switching lanes, and to control operation of the vehicle 12 based on the planned operation.

As an example, the proximity sensors 38 may include one or more LIDAR sensors. The LIDAR sensors may each be configured to measure a distance to an object external and proximate to the vehicle 12 by illuminating the target with a pulsed laser light and measuring the reflected pulses with a sensor. The LIDAR sensors may then measure the differences in laser return times and, based on these measured differences and the received wavelengths, may generate a digital 3-D representation of the object. The LIDAR sensors may further have the ability to classify various objects based on the 3-D rendering of the object. For example, by determining a shape of the target, the LIDAR sensors may classify the object as a passenger vehicle, motorcycle, truck, curb, roadblock, building, pedestrian, and so on. The LIDAR sensors may work in conjunction with other vehicle components, such as the controller 16 and other proximity sensors 38, to classify various objects outside of the vehicle 12. The LIDAR sensors may include laser emitters, laser receivers, and any other suitable LIDAR autonomous vehicle sensor components. The LIDAR sensors may further be arranged within a housing configured to rotate to facilitate scanning of the environment.

As another example, the proximity sensors 38 may include one or more cameras for capturing images of the environment surrounding the vehicle 12. For example, the proximity sensors 38 may include a forward-facing camera that is mounted to the rear-view mirror of the vehicle 12 and is configured to collect image data of the environment in front of the vehicle 12. Similarly, the proximity sensors 38 may include a rear-facing camera that is mounted to the trunk of the vehicle 12 and is configured to collect image data of the environment behind the vehicle 12, and may include side-facing cameras that are mounted to the side view mirrors of the vehicle 12 and are configured to collected image data of the environment to each side of the vehicle 12. The controller 16 may be configured to process the image data captured by the one or more cameras of the vehicle 12 to identify conditions around the vehicle 12, including, for example, the position of lane markers, the existence of traffic symbols, and the existence and operating state of other objects proximate the vehicle 12. The controller 16 may be configured to identify such conditions by comparing the location and color of pixels within the image data to prestored templates associated with various conditions.

As additional examples, the proximity sensors 38 may include one or more radar sensors, one or more ultrasonic sensors, and/or any other sensors for detecting information about the surroundings of the vehicle 12. The sensors may be mounted anywhere on the vehicle. For example, a proximity sensor 38 may be mounted on a roof of the vehicle 12 so as to have a three hundred sixty-degree view of the environment surrounding the vehicle 12. Additionally, or alternatively, various proximity sensors 38 may surround the vehicle 12 to provide a three hundred sixty-degree view of the vehicle 12. The vehicle 12 may include actuators for adjusting an angle of the field of view of the various proximity sensors 38.

The navigation system 40 may be configured to generate geographic data for the vehicle 12, such as via communicating with one or more satellites orbiting Earth. The geographic data may indicate a current geographic location of the vehicle 12, such as by including current longitude and latitude coordinates of the vehicle 12. As some non-limiting examples, the navigation system 40 may include one or more of a Global Positioning System (GPS) module, a Quazi-Zenith Satellite System (QZSS) module, a Russian Global Navigation Satellite System (GLONASS) module, a Galileo System (GSNN) module, an Indian Regional Navigation Satellite System (IRNSS) module, and an inertial navigation system (INS) module.

The navigation system 40 may communicate the geographic data to the controller 16, which may be configured to utilize the geographic data to determine the geographic location of the vehicle 12, and to correspondingly determine the geographic location of detected proximate objects. The vehicle 12 may also include a gyroscope or compass configured to indicate a current heading of the vehicle 12, which the controller 16 may combine with the geographic data to produce data indicating the current location and heading of the vehicle 12. Alternatively, the controller 16 may determine the heading of the vehicle 12 based on received geographic data indicating a changed position of the vehicle 12 over a short time span (e.g., one second), which suggests that the vehicle 12 is moving in a direction corresponding to the change in position.

The controller 16 may be configured to query the map data 34 based on the geographic data to identify information about the travel infrastructure currently in use by the vehicle 12. In particular, the map data 34 may include detailed information about travel infrastructure in various geographic locations, such as road type (e.g., highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, as some non-limiting examples. Alternatively, the controller 16 may be configured to derive at least some of this information from proximity data generated by the proximity sensors 38, such as via processing image data captured by cameras of the vehicle 12.

Responsive to receiving the geographic data from navigation system 40, the proximity data from the proximity sensors 38, and the map data 34 corresponding to the received geographic data, the controller 16 may identify the position of each detected proximate object within the currently used travel infrastructure, which may also be part of the determined operating state for each object. Specifically, the controller 16 may be configured to determine the location of the vehicle 12 within travel infrastructure based on the geographic data, the map data 34, and/or the received proximity data, including which lane of the travel infrastructure the vehicle 12 is currently located. The controller 16 may then be configured to identify the location of each detected proximate object within the currently used travel infrastructure based on the relative position of each proximate object, as indicated in the proximity data, and the map data 34. For example, if the detailed lane information included in the map data 34, or the proximity data, indicates that a particular lane is located a given distance away from the current position of the vehicle 12, and the proximity data indicates that a detected proximate object is located alongside the vehicle 12 at a distance from the vehicle 12 equal to the given distance, then the controller 16 may be configured to determine that the proximate vehicle is traveling in the given lane.

The braking system 42, steering system 44, and engine system 46 may control movement of the vehicle 12, such as at the direction of the controller 16. In particular, the controller 16 may be configured to plan an operation for each detected proximate object based on the determined operating state for each object, and may then be configured to generate a driving plan for the vehicle 12 that avoids a collision with any of the detected proximate objects assuming they act according to the planned operations. Thereafter, the controller 16 may be configured to cause the vehicle 12 to operate according to the driving plan by transmitting corresponding control signals to the braking system 42, the steering system 44, and the engine system 46. For example, the controller 16 may transmit a control signal to the braking system 42 to slow down or stop the vehicle 12, may transmit a control signal to the steering system 44 to turn or adjust a heading of the vehicle 12, and may transmit a control signal to the engine system 46 to speed up the vehicle 12 to a specified velocity, to maintain a specified velocity, and to shift gears, in accordance with the driving plan.

The remote server 14 may similar include a processor, memory, and non-volatile storage including data and software that, upon execution by the processor of the remote server 14, causes the remote server 14 to perform the functions, features, and processes of the remote server 14 discussed herein. The remote server 14 may have access to one or more autonomous databases 48, which may be maintained in the non-volatile storage of the remote server 14 or in an external persistent storage device accessible by the remote server 14, such as a network drive. The autonomous databases 48 may include up-to-date versions of the data stored in the non-volatile storage 22 of the controller 16, such as the cost function data 26, map data 34, and so on. Periodically, the controller 16 may be configured to query the remote server 14 via the communications module 36 to determine if its data is up to date. If not, the remote server 14 may be configured to transmit the up-to-date data to the vehicle 12 for inclusion in the non-volatile storage 22. Alternatively, responsive to an update to the autonomous databases 48 that is relevant to the vehicle 12, the remote server 14 may be configured to transmit the updated data to the vehicle 12.

Figure 2:
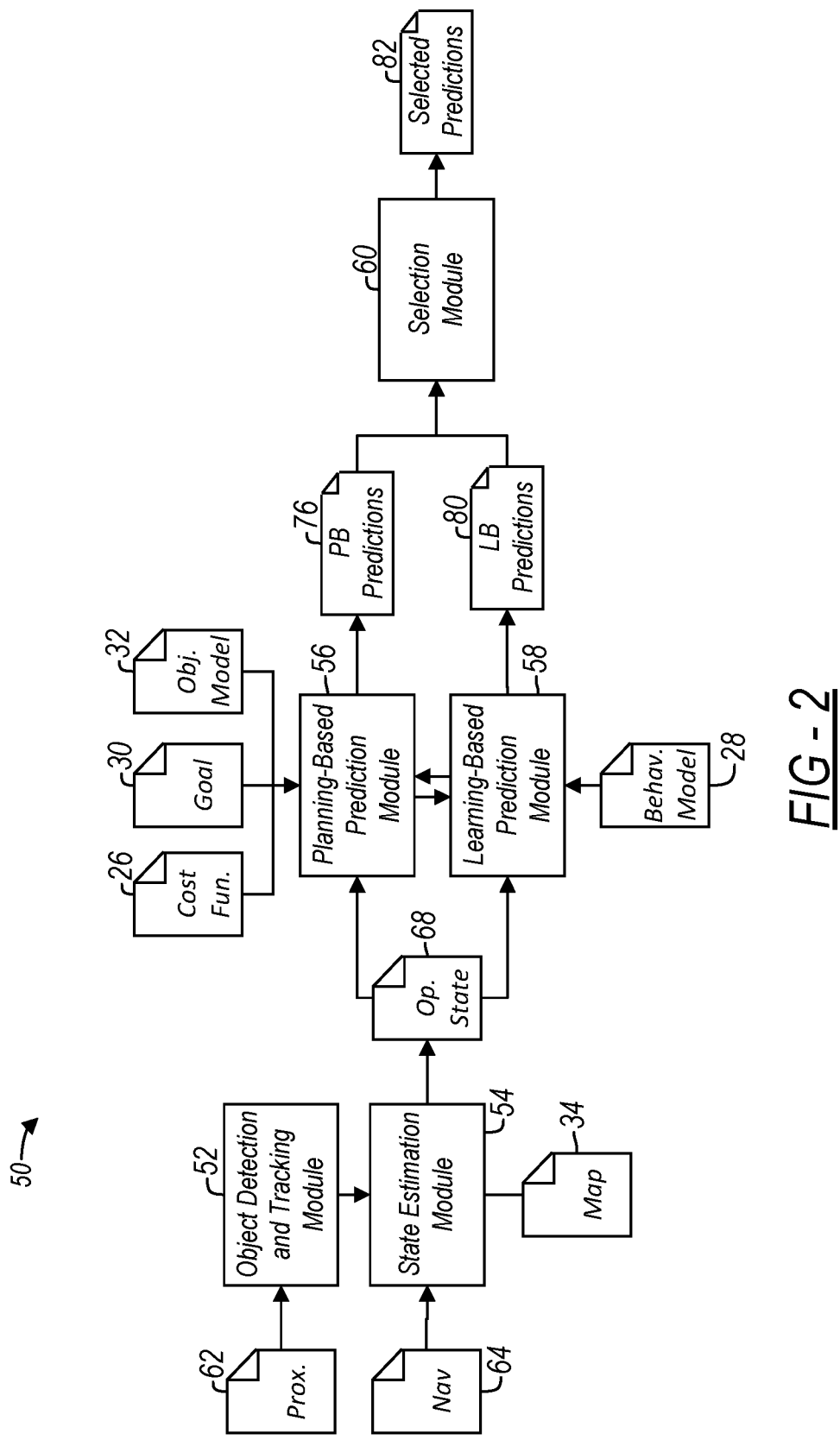
FIG. 2 is a schematic diagram of an exemplary processing architecture that may be implemented by the system of FIG. 1.

FIG. 2 illustrates a processing architecture 50 that may be implemented by the system 10, or more particularly by the controller 16, to plan operations for objects proximate the vehicle 12, which may then be utilized to determine a driving plan for the vehicle 12. The processing architecture 50 may include several modules, each being configured to perform a different function relative to planning the operation of an object proximate the vehicle 12. For example, as shown in the illustrated embodiment, the processing architecture 50 may include an object detection and tracking module 52, a state estimation module 54, a planning-based prediction module 56, a learning-based prediction module 58, and a selection module 60.

Each module of the processing architecture 50 may be implemented in hardware and/or software, such as within the controller 16 of the vehicle 12. For example, upon being read into memory 20 and executed by the processor 18, the object planner 24 may cause the controller 16, or more particularly the processor 18 of the controller 16, to implement the processing architecture 50 by performing the configured functions of each module. Each module of the processing architecture 50 may be implemented as a seperate process or a seperate thread executing on the processor 18.

The object detection and tracking module 52 may be configured to detect the existence, pose, and movement of each proximate object based on proximity data 62 received from the proximity sensors 38. The state estimation module 54 may be configured to identify the location of each detected proximate object within travel infrastructure based on geographic data 64 received from the navigation system 40 and map data 34 corresponding to the geographic data 64, and to generate operating state data 68 indicative of the operating state of each detected proximate object. The planning-based prediction module 56 may be configured to implement a planning-based approach for generating a planning-based prediction 76 of potential behavior for each detected proximate object based on the operating state data 68, cost function data 26, goal data 30, and object model data 32. The learning-based prediction module 58 may be configured to implement a learning-based approach for generating a learning-based prediction 80 of potential behavior for each detected proximate object based on the operating state data 68 and trained behavior model data 28. The selection module 60 may be configured to select between the planning-based predictions 76 and the learning-based predictions 80 generated for each detected proximate object, and thereby output selected predictions 82, which may then be utilized by the controller 16 to generate a driving plan for the vehicle 12.

Figure 3:
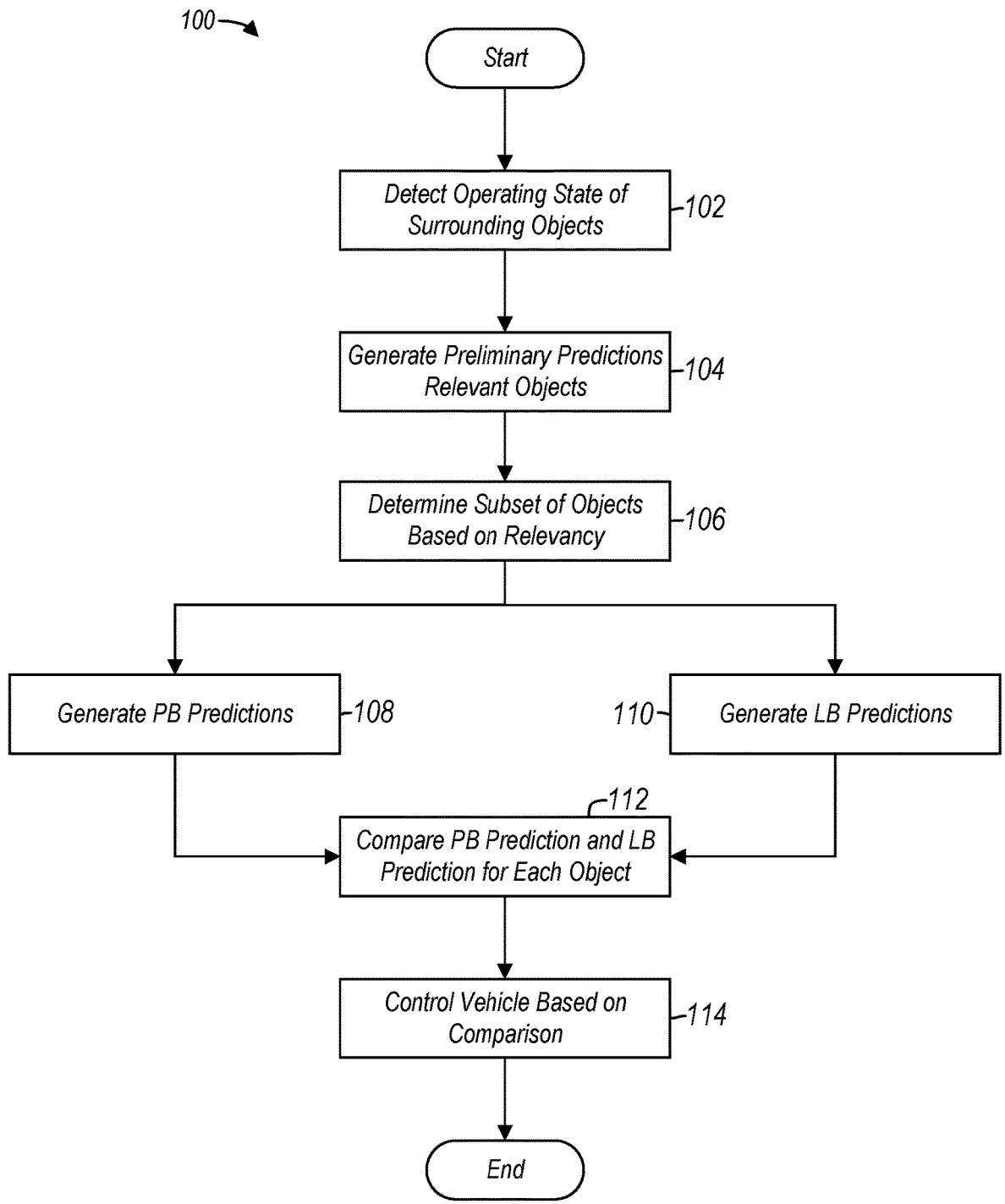
FIG. 3 is a flowchart of an exemplary process that may be performed by the system of FIG. 1.

FIG. 3 illustrates a process 100 that may be performed by the system 10, or more particularly by the processing architecture 50, to plan the operation of objects proximate the vehicle 12, and to control the vehicle 12 accordingly.

In block 102, an operating state may be detected for each object proximate the vehicle 12. Specifically, the controller 16 may be configured, such as upon execution of the object planner 24, to detect an operating state of objects, such as other vehicles, traveling or located proximate the vehicle 12. An object, which may include other vehicles, curbs, guard rails, lane lines, pedestrians, stationary objects in the road such as construction barriers and debris, may be considered as "proximate" the vehicle 12 when the object is within a particular distance from the vehicle 12, which may be based on the detection strength of the proximity sensors 38. For example, when the vehicle 12 is traveling in a given lane of a multi-lane road, objects proximate the vehicle 12 may include vehicles traveling in front of the vehicle 12 in the given lane, vehicles traveling behind the vehicle 12 in the given lane, vehicles traveling in adjacent lanes, and persons and vehicles on pedestrian paths adjacent to the road.

More particularly, during operation of the vehicle 12, the proximity sensors 38 may generate proximity data 62 indicative of the environment surrounding the vehicle 12, as described above. The object detection and tracking module 52, which may be implemented by the controller 16 upon execution of the object planner 24, may receive the proximity data 62, and may be configured to interpret the proximity data 62 to derive at least a portion of the operating state of the objects proximate the vehicle 12. For example, the object detection and tracking module 52 may be configured to generate object tracking data for each object based on the proximity data 62. The object tracking data may indicate a class of each detected object, such as whether the object is a passenger vehicle, a motorcycle, a pedestrian, and so on. The object detection and tracking module 52 may determine the class of each object from a 3D model of the object included in the proximity data 62. The object tracking data may also include a pose for each detected proximate object indicating the orientation and position of the object relative to the vehicle 12. The object tracking data may also include movement information for each detected proximate object indicating the velocity, acceleration, and/or speed of the object.

The object and tracking module 52 may be configured to communicate the object tracking data to the state estimation module 54, which may be configured to generate travel infrastructure data indicative of the position of the vehicle 12 and each detected proximate object within travel infrastructure currently being used by the vehicle 12. In particular, in addition to the object tracking data, the state estimation module 54 may receive geographic data 64 from the navigation system 40. Responsive to receiving the geographic data 64 from the navigation system 40, the state estimation module 54 may be configured to retrieve map data 34 corresponding to the geographic data 64. The state estimation module 54 may then be configured to determine the locations of the vehicle 12 and the detected proximate object within the travel infrastructure currently being used by the vehicle 12, such as whether each detected proximate object is located in a same lane of the vehicle 12, a different lane of the vehicle 12, on a walkway proximate to the vehicle 12, and so on.

The state estimation module 54 may be configured to fuse the object tracking data received from the object detection and tracking module 52, the travel infrastructure data generated by the state estimation module 54, and the retrieved map data 34 into an operating state for each detected proximate object. The state estimation module 54 may then output the operating state for each detected proximate object as operating state data 68. Hence, the operating state data 68 may indicate an operating state for each detected proximate object, which may include, without limitation, the position of the detected proximate object relative to the vehicle 12, the position of the detected proximate object relative to the travel infrastructure in use by the vehicle 12, the current movement information of the detected proximate object, and the characteristics of the travel infrastructure in which the detected proximate object is located (e.g., one-way lane, right turn only lane, road slope and curvature, speed limit).

Referring again to FIG. 3, in block 104, preliminary predictions may be generated for each detected proximity object. Specifically, the controller 16, such as upon execution of the object planner 24, may be configured to generate a preliminary prediction for each detected proximate object. Each preliminary prediction may be a coarse prediction of a potential behavior for a detected proximate object based on the current operating state of the object, or more particularly, the current pose and movement information of the object. For example, the controller 16 may be configured, for each detected proximate object, to extrapolate a trajectory for the object from the current position given the current heading, speed, velocity, and/or acceleration of the object. In other words, if the operating state of a vehicle proximate to the vehicle 12 indicates that the proximate vehicle is located in a lane adjacent to the vehicle 12 with a heading conforming to the path of the lane, a given velocity, and a given acceleration, the controller 16 may be configured to generate a preliminary prediction of a potential behavior for the proximate vehicle that includes a trajectory continuing in the lane at the given velocity and the given acceleration for a given time span (e.g., 0.5 seconds).

In block 106, a subset of the detected proximate objects may be selected, such as based on relevancy. Specifically, the controller 16 may be configured, such as upon execution of the object planner 24, to reduce the number detected proximate objects to a relevant subset so as to reduce the strain on computational resources of the vehicle 12. The controller 16 may be configured to perform the reduction using a heuristic method. For example, the controller 16 may be configured to select those detected proximate objects that are located less than a threshold distance from the vehicle 12, such as each proximate vehicle located a distance from the vehicle 12 that is less than one or more lane widths where the vehicle 12 is located. In addition, or alternatively, the controller 16 may be configured determine the subset of detected objects by determining, based on the preliminary predictions of potential behaviors for the proximate objects, which proximate objects have potential to affect the vehicle 12. For example, if the preliminary prediction for a proximate object indicates the proximate object being in, leaving, or entering the lane of the vehicle 12, crossing a path of the vehicle 12, or becoming a distance from another proximate object or the vehicle 12 that is less than a threshold distance, then the controller 16 may be configured to deem the proximate object as relevant.

The state estimation module 54, or another module implemented by the controller 16 upon execution of the object planner 24, may be configured to perform blocks 104 and blocks 106 of the process 100. Alternatively, one or both of these blocks may be omitted, and the controller 16 may be configured to consider all detected proximate objects as relevant.

In block 108, one or more planning-based predictions 76 of potential behavior may be generated for the relevant proximate objects. In particular, the controller 16 may be configured, such as upon execution of the object planner 24, to implement the planning-based prediction module 56. The planning-based prediction module 56 be configured to implement a planning-based approach to predicting behaviors of objects proximate the vehicle 12. Specifically, the planning-based prediction module 56 may be configured to determine, for each proximate object, which of a plurality of candidate potential behaviors optimize a cost function from the perspective of the object. The cost function may be defined in the cost function data 26 of the non-volatile storage 22 of the controller 16. In general, the cost function may represent the preferences of a proximate object, or those using the object (e.g., vehicle occupants), and may map each candidate potential behavior for a given object to a cost for the object. The cost function may be arbitrarily predefined, or may be learned through methods such as inverse reinforcement learning (IRL).

In addition to a candidate potential behavior, the cost function may also consider and take as input the operating state of the proximate object as defined in the operating state data 68, an object model corresponding to the determined class of the object, and one or more goals corresponding to the travel context of the object (e.g., type of road such as highway, city, or country, object class). In other words, the controller 16, such as via implementation of the planning-based prediction module 56, may be configured to generate one or more planning-based predictions 76 of potential behavior for each proximate object based on a cost function, the operating state of the proximate object, which may include pose information, movement information, class information, and map data 34 relating to the location of the proximate object, an object model corresponding to the class of the object, and one or more goals corresponding to the travel context of the object.

Thus, responsive to receiving the operating state data 68, the planning-based prediction module 56 may be configured to retrieve cost function data 26, goal data 30, and object model data 32 from the non-volatile storage 22 of the controller 16. In some embodiments, the cost function data 26 stored in the non-volatile storage 22 may include several cost functions organized by object class and/or travel context, the object model data 32 may include several object models organized by object class, and the goal data 30 may include several sets of one or more goals organized by object class and/or travel context. Thus, for a given proximate object, the planning-based prediction module 56 may be configured to retrieve a cost function, object model, and goal set from the cost function data 26, the goal data 30, and the object model data 32 respectively based on the object class and travel context indicated in the operating state data 68.

The planning-based prediction module 56 may be configured to generate at least one planning-based prediction 76 for each detected proximate object based on the operating state of the object, the retrieved cost function, the retrieved goal set, and the retrieved object model for the object. Each planning-based prediction 76 for a proximate object may be of a potential behavior for the proximate object, and may include a trajectory and a likelihood (e.g., a probability value), which may be based on the cost output by the cost function for the potential behavior.

For each detected proximate object, the planning-based prediction module 56 may be configured to generate several candidate potential behaviors. Specifically, the planning-based prediction module 56 may be configured to generate candidate trajectory data, which may indicate several candidate trajectory endpoints for a proximate object. Each candidate potential behavior may include one of the candidate trajectory endpoints, and may include a candidate trajectory from the current location of the proximate object to one of the trajectory end points. Two or more candidate potential behaviors may include a same trajectory endpoint and a different trajectory for reaching the trajectory endpoint.

The candidate trajectories and/or candidate trajectory endpoints for the candidate potential behaviors may be generated similar to the preliminary predictions discussed above. In other words, the planning-based prediction module 56 may be configured to extrapolate potential trajectories from the current operating state of the object, such as by extending the current velocity, acceleration, and heading of the object into several different directions over a given time span, and to select candidate trajectory endpoints and/or candidate trajectories for the candidate potential behaviors based on the extrapolations. In addition, or alternatively, the candidate trajectories and/or candidate trajectory endpoints may be generated by placing a trajectory and/or endpoint at regularly distanced intervals around the front half of the object, and/or or based on the goal set retrieved for the object. The goal set may indicate one or more goals for an object based on the travel context of the object. For instance, if the object is a passenger vehicle located on a highway, the retrieved goal set may include staying within the lane or changing lanes. Accordingly, the planning-based prediction module 56 may be configured to generate one or more candidate trajectories and/or candidate trajectory endpoints in which the object stays in its lane, and one or more candidate trajectories and/or candidate trajectory endpoints in which the object changes to an adjacent lane. Alternatively, if the object is a passenger vehicle located on a city road, the retrieved goal set may include staying in a lane, changing lanes, and turns. Accordingly, the planning-based prediction module 56 may be configured to generate one or more candidate trajectories and/or candidate trajectory endpoints in which the vehicle stays in its lane or turns on an upcoming road.

The selection of candidate trajectories and/or candidate trajectory endpoints may also be based on other factors, such as the current operating state of the object and object dynamics. For example, the planning-based prediction module 56 may be configured to only generate candidate trajectories ending within a threshold distance from the proximate object, or candidate trajectory endpoints within a threshold distance from the proximate object, which may be determined based on the operating state data 68 for the object. As a further example, the planning-based prediction module 56 may be configured to only generate candidate trajectories and/or candidate trajectory endpoints that are obtainable by the object based on the operating state data 68 for the object, the object model retrieved for the object, and a given timespan (e.g., one second). For instance, if reaching a given location within the timespan would necessitate that the object exceeds its performance capabilities according to the object model (e.g., necessitate a steering angle, acceleration or velocity not possible according to the object model), or break a traffic law, then the planning-based prediction module 56 may avoid generating a candidate trajectory and/or candidate trajectory endpoint including the location.

Alternatively, rather than limiting the selection of candidate trajectories and/or candidate trajectory endpoints by the object model, goals, and/or traffic laws, these items may be taken into consideration by the cost function. For example, a candidate trajectory and/or candidate trajectory endpoint that does not satisfy one of the goals, that puts a lot of strain on an object according to its object model, or breaks a traffic law may have a higher cost than a candidate trajectory that satisfies a goal, puts less strain on the object, or follows all traffic laws respectively.

The planning-based prediction module 56 may then be configured to determine, for each object and based on the candidate potential behaviors, one or more potential object behaviors that optimize the retrieved cost function from the perspective of the object. In particular, each optimal potential behavior may include a trajectory from the current location of the proximate object to one of the candidate trajectory endpoints that has a lowest cost from the perspective of the object. For example, the planning-based prediction module 56 may be configured to identify one or more of the lowest cost candidate trajectories ending at one of the candidate trajectory endpoints, or each candidate trajectory ending at one of the candidate trajectory endpoints that has a cost less than a predetermined threshold. The planning-based prediction module 56 may be configured to output each optimal potential object behavior as a planning-based prediction 76 of potential behavior for the object.

As previously described, the cost function may map a candidate trajectory for an object to a cost to the object for acting according to the candidate trajectory, and may consider factors such as the operating state of the object, including the map data 34 retrieved for the object, the goal set retrieved for the object, and a model retrieved for the object. In particular, candidate trajectories for an object that avoid certain instances or circumstances may have a lower cost than candidate trajectories that confront those instances or circumstances, and may thus be preferred.

For example, trajectories involving large accelerations or decelerations may have a higher cost according to the cost function than trajectories involving relatively lower accelerations or decelerations. As a further example, trajectories involving changing lanes or turning may have a higher cost than trajectories not involving a lane change or turn. As an additional example, trajectories that break traffic laws (e.g., passing in a no-pass zone, driving over a curb or on a shoulder) may have a relatively high cost, but may have a cost less than the cost of colliding with a stationary object, which may have a cost less than the cost of colliding with another vehicle, which may have a cost less than the cost of colliding with a pedestrian. As another example, trajectories that do not satisfy at least one of the goals of the goal set retrieved for the object may have a higher cost than those that do satisfy a goal. The characteristics of a given candidate trajectory relative to a cost factor such as these may be determined based on the operating state data 68 for an object, including the retrieved map data 34, determined positional data, and determined movement data for the object, based on the goal set retrieved for the object, and based on the object model retrieved for the object.

The output of the cost function for a given candidate trajectory may also depend on the class of object and/or the object model for the object. For example, performing fast or aggressive maneuvers may be more comfortable and less resource intensive for smaller vehicles than for large trucks. Accordingly, the cost function may be configured to generate higher costs for such maneuvers when the object is a truck as opposed to when the object is a small passenger vehicle. For this purpose, the cost function may include weights for different cost factors that, depending on the object class or object model, place more emphasis on certain cost factors and less on other cost factors.

When calculating the cost to a given proximate object of taking a given trajectory or ending at a given trajectory endpoint, the controller 16, such as via implementation of the planning-based prediction module 56, may be configured to assume that the other proximate objects and the vehicle 12 are going to move according a simple motion model, such as the model utilized for determining the preliminary predictions described above. In other words, the planning-based prediction module 56 may be configured to extrapolate at least one simple model trajectory for each other proximate object from the current operating state of the object, such as by extending the current velocity, acceleration, and heading of the object over a given time span, and may do the same for the vehicle 12. The controller 16 may then assume that the other proximate objects and the vehicle 12 act according to their simple model trajectories when analyzing the cost to the given proximate object of taking a given candidate trajectory or heading towards a given candidate trajectory endpoint, such as by identifying whether the given candidate trajectory or candidate trajectory endpoint would likely result in the given proximate object colliding with or becoming within a threshold distance of another proximate object or the vehicle 12 when following at least one of simple model trajectories. If so, then the cost function may output an increased cost value for the candidate trajectory or candidate trajectory endpoint relative to a candidate trajectory or candidate trajectory endpoint that would not likely result in the given proximate object colliding with or becoming with the threshold distance of another proximate object or the vehicle 12 when following at least one of simple model trajectories.

As a non-limiting example, the cost function may be represented by the following equation:

$$\text{Cost} = \sum_{i=0}^{y} w_i f_i(x_i)$$

where $f_i(\ )$ is a function configured to determine a cost value with respect to a cost factor i (e.g., acceleration, heading or lane change, collision), $x_i$ is a characteristic of a candidate trajectory for the cost factor i (e.g., acceleration level, degree of heading change, whether or not a collision is likely to occur), $w_i$ is a weight given to each cost factor i, and y is the total number of cost factors.

The planning-based prediction module 56 may be configured to generate one or more optimal potential behaviors for each proximate object by identifying a cost value for each candidate trajectory generated for the proximate object. For example, the planning-based prediction module 56 may be configured to apply each candidate trajectory to the cost function, along with any other relevant information, including the operating state data 68 for the object, the goal set retrieved for the object, and the object model retrieved for the object, to obtain a cost value to the proximate object for taking the candidate trajectory. In some embodiments, the planning-based prediction module 56 may be configured to perform this calculation by selecting one or more sample points of each trajectory, determining a cost value to the object at each sample point based on the cost function, and averaging the cost values to identify an overall cost value for the trajectory. Thereafter, the planning-based prediction module 56 may be configured to select one or more of the lowest cost candidate trajectories, or may select each candidate trajectory for which the total cost is less than a threshold cost, for the optimal potential behaviors of the planning-based predictions 76.

In some embodiments, the planning-based prediction module 56 may be configured to utilize an efficiency-based approach that determines the one or more lowest cost candidate trajectories for a given proximate object based on the candidate trajectory endpoints generated for the proximate object. Specifically, for each candidate trajectory endpoint, the planning-based prediction module 56 may be configured to utilize a graph search (e.g., A*) approach, a trajectory optimizer, or similar method to determine a lowest cost candidate trajectory between the current location of the object and the candidate trajectory endpoint according to the cost function. Thereafter, the planning-based prediction module 56 may select one or more lowest cost trajectories from the determined lowest cost candidate trajectories generated for all the candidate trajectory end points, or may select each determined lowest cost candidate trajectory for which the cost is less than a threshold cost value, for the optimal potential behaviors of the planning-based predictions 76.

The planning-based prediction module 56 may also be configured to assign a likelihood to each planning-based prediction 76 of optimal potential behavior. The likelihood assigned to a given optimal potential behavior may be based on the cost of the trajectory of the optimal potential behavior according to the cost function. Specifically, the lower the cost associated with the trajectory of a planning-based prediction 76 of optimal potential behavior, the higher the likelihood that the object may perform the potential behavior. The planning-based prediction module 56 may be configured to normalize the cost for each optimal potential behavior between zero and one, and subtract the normalized value from one to determine the likelihood. Alternatively, the planning-based prediction module 56 may be configured to assign a likelihood to a planning-based prediction 76 of potential behavior based on how many standard deviations the cost of the potential behavior is from an average cost for the candidate trajectories. Each planning-based prediction 76 of potential behavior produced by the planning-based prediction module 56 may thus include a trajectory and a likelihood value.

In block 110, one or more learning-based predictions 80 of potential behavior may be generated for each proximate object. Specifically, the controller 16, upon execution of the object planner 24, may be configured to implement the learning-based prediction module 58. The learning-based prediction module 58 may be configured to generate the learning-based predictions 80 based on the operating state data 68 and a trained behavior model, which may be defined in the trained behavior model data 28 included in the non-volatile storage 22 of the controller 16. In particular, the trained behavior model data 28 may include at least one trained behavior model that, given a set of observations about a proximate object, predicts a behavior of the object based on a data set of previously observed behavior of similar objects. A trained behavior model may essentially function as a lookup table to predict potential behaviors, and may not consider the cost of the object of performing a potential behavior.

The learning-based prediction module 58 may thus be configured to apply the operating state of each proximate object, as indicated in the operating state data 68, to a trained object behavior model, which may output one or more learning-based predictions 80 of potential behavior for the object. Similar to the planning-based predictions 76, each learning-based prediction 80 may be a prediction of a potential behavior for an object, and may include a trajectory and a likelihood. The likelihood may be based on the data from which the trained behavior model was trained. For example, if the training data indicates that ninety percent of the time, an object changed lanes when exhibiting behavior similar to the operating state of a proximate object, the trained object behavior model may generate a learning-based prediction 80 that includes a trajectory involving a lane change and a ninety percent likelihood. Alternatively, the likelihood of each potential behavior predicted by the learning-based prediction module 58 may be generated by applying the trajectory of the potential behavior to the cost function, as described above.

Given their different approaches, the planning-based prediction module 56 and the learning-based prediction module 58 may produce different predictions of potential object behavior for an object. For example, the trajectory of a planning-based prediction 76 for a proximate object may differ from the trajectory of the learning-based prediction 80 for the object. In some embodiments, the planning-based prediction module 56 may be configured generate one or more planning-based predictions 76 for a proximate object based on a learning-based prediction 80 generated for the object by the learning-based prediction module 58, and/or vice versa. For example, in some embodiments, the controller 16, such as via implementation of the planning-based prediction module 56, may be configured to determine whether each learning-based prediction 80 of potential behavior generated for each proximate object is likely to result in a collision with another proximate object or the vehicle 12, such as assuming the other objects and the vehicle 12 operate in accordance with the simple model predictions described above. If so, then the controller 16 may be configured to also generate one or more planning-based predictions 76 for the proximate object via the planning-based prediction module 56.

As further examples, in addition or alternatively to using the simple model predictions described above, the planning-based prediction module 56 may be configured to generate one or more planning-based predictions 76 for a given proximate object assuming that the other detected proximate objects and the vehicle 12 will operate according to learning-based predictions 80 generated by the learning-based prediction module 58 for the other proximate objects and the vehicle 12, and/or the learning-based prediction module 58 may be configured to generate one or more learning-based predictions 80 for a given proximate object assuming that the other proximate objects and the vehicle 12 will operate according to planning-based predictions 76 generated by the planning-based prediction module 56 for the other proximate objects and the vehicle 12. To this end, the controller 16 may be configured such that the planning-based prediction module 56 generates the planning-based predictions 76 before the learning-based prediction module 58 generates the learning-based predictions 80, or vice versa, or both modules may produce predictions contemporaneously based on the simple model predictions discussed above.

Responsive to generation of the planning-based predictions 76 and the learning-based predictions 80 for the proximate objects, the controller 16 may be configured to generate a driving plan for the vehicle 12 that avoids a collision with each detected proximate object, assuming each proximate object operates according to one or more of the planning-based predictions 76 and/or one or more of the learning-based predictions 80 generated for the object. In some embodiments, the controller 16 may be configured to generate a driving plan for the vehicle 12 that avoids a collision regardless of whether each proximate object follows the learning-based predictions 80 or the planning-based predictions 76 generated for the object.

Alternatively, the controller 16 may be configured to select between using the one or more planning-based predictions 76 and/or the one or more learning-based predictions 80 for each proximate object. For example, in block 112, the planning-based predictions 76 and the learning-based predictions 80 for each object may be compared. Specifically, the controller 16, upon execution of the object planner 24, may be configured to implement the selection module 60. The selection module 60 may be configured to compare the planning-based predictions 76 and the learning-based predictions 80, and to select which predictions should serve as a basis for the driving plan (e.g., the selected predictions 82). For instance, the selection module 60 may be configured to select one or more predictions based on which predictions are more likely, such as based on the likelihood of each prediction (e.g., the one or more most likely predictions). As a further example, the selection module 60 may be configured to select the learning-based predictions 80 unless one or more of the planning-based predictions 76 have a likelihood that is greater than the likelihood of one or more learning-based predictions 80 by at least a set threshold, in which case the selection module 60 may select the one or more planning-based predictions 76, and may also select or may disregard the one or more learning-based predictions 80 with less of a likelihood.

As another example, the selection module 60 may be configured to generate the selected predictions 82 based on which predictions are more conservative, such as from a cost perspective. Specifically, if a learning-based prediction 80 for a proximate object might result in a collision or some other undesired event, then the cost to the object for operating according to the prediction may be relatively high, indicating an unconservative or undesired maneuver. In this case, the selection module 60 may be configured to select the planning-based prediction 76 for the object when generating a driving plan for the vehicle 12. In other words, the selection module 60 may be configured to apply the learning-based predictions 80 to the cost function utilized by the planning-based prediction module 56, and to identify whether the cost output by the cost function is greater than the cost for any of the planning-based predictions 76, or whether the cost output by the cost function is greater than the cost for any of the planning-based predictions 76 by at least a set threshold. If so, then the selection module 60 may be configured to select the planning-based predictions 76 having the lower cost for the object. If not, then the selection module 60 may be configured to select the learning-based predictions 80 for the object.

In block 114, the vehicle 12 may be controlled based on the comparison in block 112. Specifically, the controller 16 may be configured to generate a driving plan for the vehicle 12 that avoids a collision with each proximate object assuming the proximate object operates according to the selected predictions 82. The controller 16 may then communicate control signals to the braking system 42, steering system 44, and the engine system 46 that causes these systems to operate the vehicle 12 according the driving plan.

Figure 4:
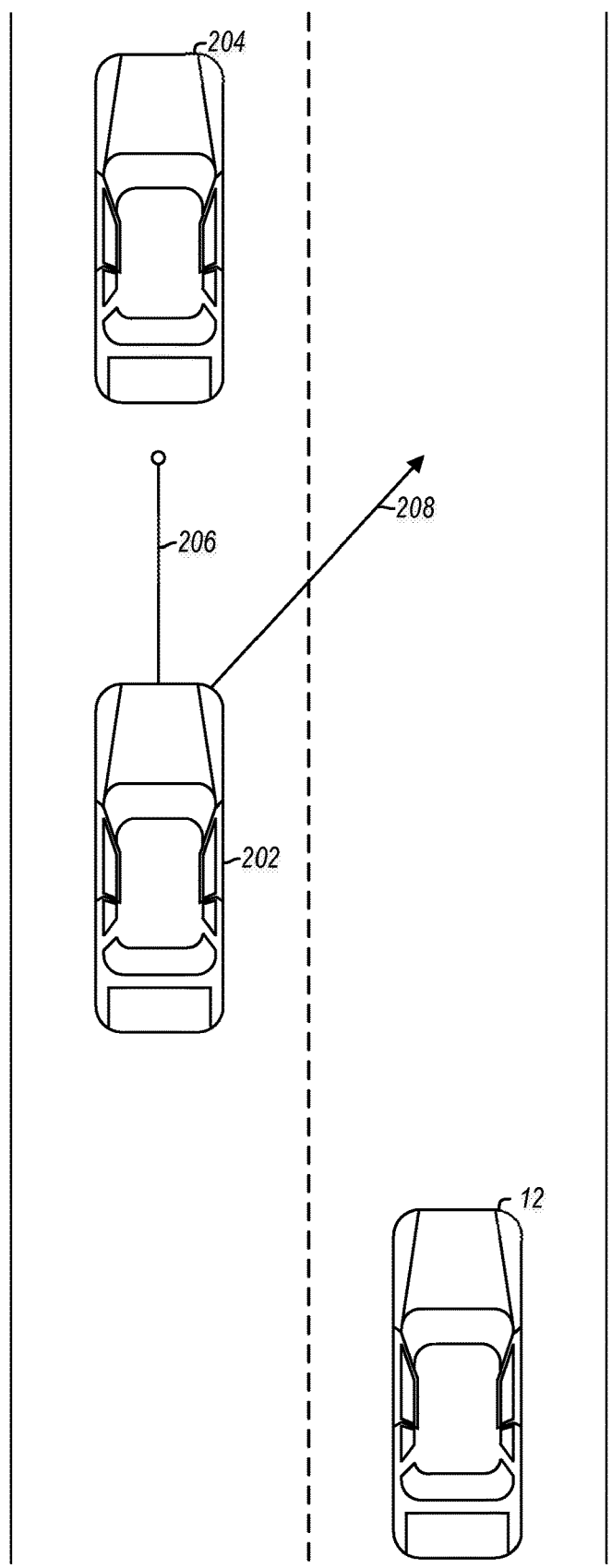
FIG. 4 is a diagram of an exemplary road situation in which the exemplary system of FIG. 1 may control a vehicle by planning operation on behalf of an object proximate the vehicle.

FIG. 4 illustrates an example of the controller 16 of the vehicle 12 controlling movement of the vehicle 12 by planning operation of another vehicle 202. As shown in the illustrated example, the vehicle 12, the other vehicle 202, and a leading vehicle 204 may be driving down a two-lane road. The vehicle 12 may be traveling in the right lane, and the other vehicle 202 may be traveling in the left lane ahead of the vehicle 12, such as about one hundred meters ahead. The leading vehicle 204 may also be traveling in the left lane ahead of the vehicle 202, such as about one hundred twenty meters ahead. Each of the vehicles 202, 204 may be driver-operated vehicles, such that movement of the respective vehicle is provoked by continuous driver interaction with in-vehicle driving controls including a steering wheel, a gas pedal, and a brake pedal.

During travel of the vehicles 12, 202, 204, the leading vehicle 204 may suddenly decelerate. Responsively, the controller 16 of the vehicle 12 may detect the sudden deceleration, such as based on proximity data generated by the proximity sensors 38, and may predict how the vehicle 202 will react. To this end, the controller 16, such as based on the detected operating state of the other vehicle 202, may be configured to produce a learning-based prediction 80 and a planning-based prediction 76 for the other vehicle 202. For the learning-based prediction 80, the controller 16, such as via implementation of the learning-based prediction module 58 and based on a trained behavior model, may predict that the other vehicle 202 will also decelerate as needed to avoid rear ending the other vehicle 204, which may be represented by the trajectory arrow 206 included in FIG. 4.

The controller 16 may also, such as via implementation of the planning-based prediction module 56, generate a planning-based prediction 76 for the other vehicle 202 that includes a trajectory 208 in which the vehicle 202 merges into the lane of the vehicle 12 in front of the vehicle 12. Specifically, given at least the current operating state of the other vehicle 202, the controller 16 may determine that the trajectory 208 optimizes a cost function from the perspective of the vehicle 202. For instance, the cost function may be configured such that changing lanes and avoiding a large deceleration is less costly than staying in a lane and performing a large deceleration, such as based on the current velocity, acceleration, travel context, goals, and object model for the vehicle 202. Moreover, the likelihood of the planning-based prediction 76 may be at least a set threshold greater than the likelihood of the learning-based prediction 80, such as because the trained behavior model lacks a large data set of previous object behaviors for this situation, or because the cost value output by the cost function for the learning-based prediction 80 trajectory is greater than the cost value of the planning-based prediction 76 trajectory by at least a set threshold.

Thus, responsive to generating the learning-based prediction 80 and the planning-based prediction 76, the controller 16 may select, such as via implementation of the selection module 60, at least the planning-based prediction 76 as one of the selected predictions 82 on which to base a driving plan for the vehicle 12. Specifically, the controller 16, such as based on the planning-based prediction 76, may generate a driving plan in which the vehicle 12 decelerates to avoid a collision with a merging other vehicle 202. The controller 16 may then cause the vehicle 12 to decelerate according to the driving plan, such as by transmitting a corresponding control signal to the braking system 42 of the vehicle 12.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. An autonomous driving system of a first vehicle comprising: a controller configured to detect an operating state of a second vehicle traveling proximate the first vehicle; predict, at the first vehicle, a first potential behavior of the second vehicle based on the operating state of the second vehicle and from a perspective of the second vehicle, wherein the prediction comprises determining a plurality of characteristics of a cost function from a point of view of the second vehicle and optimizing the cost function from the point of view of the second vehicle, wherein the plurality of characteristics pertain to motion of the second vehicle; and control the first vehicle to avoid a collision with the second vehicle assuming the second vehicle operates according to the first potential behavior.

2. The autonomous driving system of claim 1, wherein the first potential behavior includes a first probability based on the cost function, and the controller is configured to:
apply the operating state of the second vehicle to a trained behavior model to predict a second potential behavior for the second vehicle, the second potential behavior including a second probability based on the trained behavior model;
compare the first probability and the second probability; and
control the first vehicle to avoid colliding with the second vehicle based on the comparison.

3. The autonomous driving system of claim 2, wherein the first potential behavior includes a first trajectory for the second vehicle, and the second potential behavior includes a second trajectory for the second vehicle that differs from the first trajectory.

4. The autonomous driving system of claim 2, wherein the controller is configured to:
detect an operating state of a third vehicle traveling proximate the first vehicle;
apply the operating state of the third vehicle to the trained behavior model to predict a third potential behavior for the third vehicle; and
predict the first potential behavior for the second vehicle that optimizes the cost function from the perspective of the second vehicle based on the third potential behavior predicted for the third vehicle.

5. The autonomous driving system of claim 1, wherein the controller is configured to:
generate, based on the operating state of the second vehicle, candidate trajectories for the second vehicle, each of the candidate trajectories having a cost according to the cost function; and
select, for the first potential behavior, the candidate trajectory having a lowest cost.

6. The autonomous driving system of claim 5, wherein the controller is configured to:
identify a travel context for the first vehicle and the second vehicle;
retrieve a goal set based on the travel context; and
generate the candidate trajectories based on the goal set.

7. The autonomous driving system of claim 6, wherein the controller is configured to, prior to generating the candidate trajectories, generate candidate trajectory endpoints for the second vehicle based on the goal set, wherein each of the candidate trajectories is to a different one of the candidate trajectory endpoints and optimizes the cost function for the candidate trajectory endpoint.

8. The autonomous driving system of claim 1, wherein the controller is configured to:
retrieve map data relating to a geographic location of the first vehicle; and
predict the first potential behavior for the second vehicle that optimizes the cost function from the perspective of the second vehicle based on the map data.

9. The autonomous driving system of claim 8, wherein the controller is configured to:
detect third vehicles traveling proximate the first vehicle;
select, based on the map data, a subset of the third vehicles including each of the third vehicles that is located less than a lane width from the first vehicle, the subset of the third vehicles including the second vehicle;
predict, for each third vehicle in the subset and not for each third vehicle outside the subset, a potential behavior for the third vehicle that optimizes the cost function from the perspective of the third vehicle; and
control the first vehicle to avoid colliding with each third vehicle assuming each third vehicle operates according to the potential behavior predicted for the third vehicle.

10. The autonomous driving system of claim 1, wherein the controller is configured to:
determine a class of the second vehicle; and
predict the first potential behavior for the second vehicle that optimizes the cost function from the perspective of the second vehicle based on the class.

11. A controller for an autonomous driving system of a first vehicle, the controller comprising: at least one processor; and a memory storing instructions that, upon execution by the at least one processor, causes the at least one processor to: detect an operating state of a second vehicle traveling proximate the first vehicle; predict, at the first vehicle, a first potential behavior of the second vehicle based on the operating state of the second vehicle and from a perspective of the second vehicle, wherein the prediction comprises determining a plurality of characteristics of a cost function from a point of view of the second vehicle and optimizing the cost function from the point of view of the second vehicle, wherein the plurality of characteristics pertain to motion of the second vehicle; and control the first vehicle to avoid a collision with the second vehicle assuming the second vehicle operates according to the first potential behavior.

12. The controller of claim 11, wherein the first potential behavior includes a first probability based on the cost function, and the instructions upon execution cause the at least one processor to:
apply the operating state of the second vehicle to a trained behavior model to predict a second potential behavior for the second vehicle, the second potential behavior including a second probability based on the trained behavior model;
compare the first probability and the second probability; and
control the first vehicle to avoid colliding with the second vehicle based on the comparison.

13. The controller of claim 12, wherein the first potential behavior includes a first trajectory for the second vehicle, and the second potential behavior includes a second trajectory for the second vehicle that differs from the first trajectory.

14. The controller of claim 12, wherein the instructions upon execution cause the at least one processor to:
- detect an operating state of a third vehicle traveling proximate the first vehicle;
- apply the operating state of the third vehicle to the trained behavior model to predict a third potential behavior for the third vehicle; and
- predict the first potential behavior for the second vehicle that optimizes the cost function from the perspective of the second vehicle based on the third potential behavior predicted for the third vehicle.

15. The controller of claim 11, wherein the instructions upon execution cause the at least one processor to:
- generate, based on the operating state of the second vehicle, candidate trajectories for the second vehicle, each of the candidate trajectories having a cost according to the cost function; and
- select, for the first potential behavior, the candidate trajectory having a lowest cost.

16. The controller of claim 15, wherein the instructions upon execution cause the at least one processor to:
- identify a travel context for the first vehicle and the second vehicle;
- retrieve a goal set based on the travel context; and
- generate the candidate trajectories based on the goal set.

17. The controller of claim 16, wherein the instructions upon execution cause the at least one processor to, prior to generating the candidate trajectories, generate candidate trajectory endpoints for the second vehicle based on the goal set, wherein each of the candidate trajectories is to a different one of the candidate trajectory endpoints and that optimizes the cost function for the candidate trajectory endpoint.

18. The controller of claim 11, wherein the instructions upon execution cause the at least one processor to:
- retrieve map data relating to a geographic location of the first vehicle; and
- predict the first potential behavior for the second vehicle that optimizes the cost function from the perspective of the second vehicle based on the map data.

19. The controller of claim 18, wherein the instructions upon execution cause the at least one processor to:
- detect third vehicles traveling proximate the first vehicle;
- select, based on the map data, a subset of the third vehicles including each of the third vehicles that is located less than a lane width from the first vehicle, the subset of the third vehicles including the second vehicle;
- predict, for each third vehicle in the subset and not for each third vehicle outside the subset, a potential behavior for the third vehicle that optimizes the cost function from the perspective of the third vehicle; and
- control the first vehicle to avoid colliding with each third vehicle assuming each third vehicle operates according to the potential behavior predicted for the third vehicle.

20. A method comprising: by one or more processors of a first vehicle: detecting an operating state of a second vehicle traveling proximate the first vehicle; predicting, at the first vehicle, a first potential behavior of the second vehicle based on the operating state of the second vehicle and from a perspective of the second vehicle, wherein the prediction comprises determining a plurality of characteristics of a cost function from a point of view of the second vehicle and optimizing the cost function from the point of view of the second vehicle, wherein the plurality of characteristics pertain to motion of the second vehicle; and controlling the first vehicle to avoid a collision with the second vehicle assuming the second vehicle operates according to the potential behavior.

* * * * *